(12) United States Patent
Ishibashi et al.

(10) Patent No.: US 7,177,253 B2
(45) Date of Patent: Feb. 13, 2007

(54) OPTICAL DISC DRIVE FOR CONTROLLING LASER EMISSION

(75) Inventors: Hiromichi Ishibashi, Ibaraki (JP); Tetsuya Shihara, Kadoma (JP); Hisashi Senga, Neyagawa (JP); Toshio Matsumoto, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 3 days.

(21) Appl. No.: 10/524,896

(22) PCT Filed: Oct. 6, 2003

(86) PCT No.: PCT/JP03/12800

§ 371 (c)(1),
(2), (4) Date: Feb. 17, 2005

(87) PCT Pub. No.: WO2004/036564

PCT Pub. Date: Apr. 29, 2004

(65) Prior Publication Data

US 2005/0254403 A1    Nov. 17, 2005

(30) Foreign Application Priority Data

Oct. 17, 2002  (JP) ............................. 2002-302934

(51) Int. Cl.
*G11B 7/00* (2006.01)

(52) U.S. Cl. ............................... 369/53.27; 369/53.26; 369/47.52

(58) Field of Classification Search ............. 369/53.27, 369/53.26
See application file for complete search history.

(56) References Cited

U.S. PATENT DOCUMENTS 5,067,122 A  * 11/1991 McGee ...................... 369/116
5,109,367 A  *  4/1992 Yoshikawa ............... 369/44.25
6,055,011 A      4/2000 Nishimura
6,134,210 A  * 10/2000 Masakado et al. ....... 369/53.26
2002/0036963 A1*  3/2002 Shimoda ................... 369/47.53
2004/0081050 A1*  4/2004 Yamamoto ............... 369/53.26
2005/0201252 A1*  9/2005 Zucker ....................... 369/116

FOREIGN PATENT DOCUMENTS

| EP | 0 385 537 A2 | 9/1990 |
| JP | 63-62930 U | 4/1988 |
| JP | 03142724 | 6/1991 |
| JP | 05-250673 A | 9/1993 |
| JP | 06-139578 A | 5/1994 |
| JP | 2000-251266 A | 9/2000 |

* cited by examiner

*Primary Examiner*—Wayne Young
*Assistant Examiner*—Linh T. Nguyen
(74) *Attorney, Agent, or Firm*—Akin Gump Strauss Hauer & Feld, LLP (57) ABSTRACT

In an optical disc drive, a laser light source emits a laser beam having an intensity changeable with the amount of drive current supplied. A first photodetector receives the laser beam reflected from an optical disc, thereby generating a readout signal. A second photodetector receives the laser beam, generates an electric signal representing the power of the laser beam received, and outputs the electric signal as a light quantity detection signal. A feedback control loop compares the level of the light quantity detection signal with a predetermined target value and regulates the drive current such that the level of the light quantity detection signal approaches the target value. In reading data from the optical disc, the target value is changed so as to compensate for a variation of the sensitivity of the second photodetector, thereby controlling the power of the laser beam emitted from the laser light source.

11 Claims, 5 Drawing Sheets

OPTICAL DISC DRIVE FOR CONTROLLING LASER EMISSION

CROSS-REFERENCE TO RELATED APPLICATIONS

This application is a section 371 of International Application No. PCT/JP2003/012800, filed Oct. 6, 2003, which was published on the English Language on Apr. 29, 2004 under International Publication No. WO 2004/036564 A1, the disclosure of which is incorporated herein by reference.

TECHNICAL FIELD

The present invention generally relates to an optical disc drive. More particularly, the present invention relates to an optical disc drive for reading and writing information with a short wavelength laser beam, which falls within the violet wavelength range, while controlling the power of the laser beam automatically.

BACKGROUND ART

Recently, optical disc drives with both reading and writing capabilities, such as DVD-RAM recorders, for example, have been rapidly popularized. In writing data on a rewritable optical disc, the power of a laser beam (which will be referred to herein as the "laser power") needs to be adjusted appropriately, which is one of the most important issues for rewritable optical disc technologies.

A recordable optical disc includes a data storage layer, which is made of a phase change material such as GeTeSb, for example, on a substrate. In writing data on such an optical disc, this data storage layer is exposed to a relatively high-power laser beam. Then, a portion of the data storage layer, which has been irradeated by the laser beam, comes to have a locally increased temperature, thereby changing the "phase" of the data storage layer due to the heat generated. More specifically, that laser-exposed portion of the data storage layer changes from the crystal phase to the amorphous phase. Such an amorphous portion of the layer will function as a recording mark. Accordingly, when the data writing process is completed, multiple recording marks and spaces will be alternately formed along the tracks. In this case, those recording marks have a different refractive index from the spaces. Thus, when the tracks on the data storage layer are irradeated by a laser beam that has too low an intensity to change the crystallinity of the data storage layer, data can be read out from the data storage layer according to the intensity of the reflected light. In this manner, when reading data from such an optical disc, the power of the laser beam should be defined weak enough to keep the crystallinity of the data storage layer unchanged.

However, various problems will arise unless the laser power to write data on such an optical disc (which will be referred to herein as "write power") is controlled to an appropriate level. For example, if the laser power is too weak, then the exposed portion of the data storage layer will not be heated well enough to cause the phase change, and the information will not be written as intended. On the other hand, if the laser power is too strong, then the laser-exposed and heated portion will expand its area so much that a portion of the information previously recorded on an adjacent track might be cross-erased. To overcome these problems, an optical disc drive normally has the function of controlling the laser power to an appropriate level during a data write operation. When such an optical disc drive starts to work with an optical disc loaded thereto, the optical disc drive, first of all, carries out a self calibration, that is, a sequence of optimizing the write power. The best write power level is not the same among various types of the specific optical discs loaded.

On the other hand, not only the cross-erasing but other problems will not occur as long as the laser power to read data from such an optical disc (which will be referred to herein as "read power") is weak enough to keep the crystallinity of the data storage layer unchanged. For that reason, even when the conventional optical disc drive starts with such an optical disc loaded thereto, the optical disc drive never carries out the sequence of optimizing the read power.

However, the present inventors discovered and confirmed via experiments that if the read power was not weak enough, then the temperature of the laser-exposed portion of the data storage layer slightly increased to reach the vicinity of the phase-changeable level (i.e., from the amorphous level to the crystal level). Accordingly, if a portion of the data storage layer with a recording mark is irradeated by the excessive reading laser beam, then the recording mark in the amorphous state might be recrystallized at least partially. In that case, the quality of the information stored there would deteriorate and sufficient read stability could not be maintained anymore. Such a decrease in read stability due to the exposure to that slightly intense reading laser beam will be referred to herein as "read light induced deterioration". On the contrary, it should be noted that if the read power is too weak, then the readout signal cannot have a sufficiently high SNR and read errors are very likely to occur.

Japanese Laid-Open Utility Model Publication No. 63-062930 discloses a technique of performing a feedback control operation such that the modulated writing laser power is equalized with an average of binary information to be written.

Japanese Laid-Open Publication No. 06-139578 discloses a technique of optimizing the write power highly precisely by trying writing a test pattern of a particular signal.

Japanese Laid-Open Publication No. 05-250673 discloses a technique of saving the trouble of starting the same optimization search all over again by storing the result of such trial writing.

Japanese Laid-Open Publication No. 12-251266 discloses a technique of increasing the write stability by sufficiently decreasing the laser power while data is being read.

Each of these conventional techniques was developed on the assumption that the laser power always be detected accurately. Also, each of these techniques requires that a feedback control be done to control the laser power detected at a predetermined target value.

Recently, however, to increase the storage densities of optical discs, short-wavelength laser light sources have been developed and gradually adopted in actual optical disc drives. For example, the conventional red laser light source is going to be replaced by a blue laser light source. This trend will be more and more accelerated because the shorter the wavelength of a laser beam emitted, the smaller the size of the laser beam spot on the optical disc.

However, the shorter the wavelength of the laser beam is, the higher the energy of light impinging on a photodetector for detecting the laser power becomes. The energy of light per photon is given by $e = h\upsilon$, where e is the energy per photon, h is Planck's constant, and $\upsilon$ is the frequency of light. $\upsilon$ is inversely proportional to the wavelength of the light. Thus, it can be seen that the shorter the wavelength, the higher the energy e.

Also, such high-energy light will give more and more damage on optical elements, which are usually made of crystals or polymers. For example, a PIN photodiode, which is often used as a photodetector, will gradually decrease its sensitivity when exposed to a blue ray for a long time.

Furthermore, as the sensitivity of such a photodetector decreases, the controlled laser power also varies, which is a non-negligible problem. In the conventional techniques mentioned above, the laser power control system carries out a feedback control so that the output (current value) of the photodetector gets equal to a target value. Accordingly, once the sensitivity of the photodetector has decreased, the output (current value) thereof will also decrease even if the photodetector has received the laser beam of the same intensity. As a result, the feedback control works such that the output (current value) of the photodetector approaches the target value. Consequently, the laser power will increase beyond its original level.

In the technique of finding the best write power to obtain the best readout signal while sequentially changing the write power and actually writing test data on the optical disc, the write power can still be optimized even if the sensitivity of the photodetector has decreased. This is because this technique enables the target value to be controlled, thereby redefining the output of the photodetector at a lower value once the sensitivity of the photodetector has decreased.

The conventional optical disc drives may sometimes optimize the write power but none of those optical disc drives has ever been designed to control the read power. This is because nobody has ever believed that the deterioration in read stability, which should be caused by the increase in read power when the sensitivity of the photodetector decreases, would bring about a serious problem. Accordingly, in the conventional optical disc drives, when the sensitivity of the photodetector decreases in a long-time exposure, the data will be read out with a laser beam that has so high a level as to crystallize the recording marks partially, thus also resulting in the read light induced deterioration.

DISCLOSURE OF INVENTION

In order to overcome the problems described above, preferred embodiments of the present invention provide an optical disc drive that can control its laser light source with appropriate read power even when the sensitivity of its photodetector decreases.

An optical disc drive according to a preferred embodiment of the present invention preferably includes a laser light source, a first photodetector, a second photodetector, and a feedback control loop. The laser light source preferably emits a laser beam of which the intensity is changeable with the amount of drive current supplied thereto. The first photodetector preferably receives a portion of the laser beam that has been emitted from the laser light source and then reflected from an optical disc, thereby generating a readout signal. The second photodetector preferably receives another portion of the laser beam that has been emitted from the laser light source, generates an electric signal of which the level represents the power of the laser beam received, and outputs the electric signal as a light quantity detection signal. The feedback control loop preferably compares the level of the light quantity detection signal with a predetermined target value and preferably controls the amount of the drive current so that the level of the light quantity detection signal approaches the target value. In reading data from the optical disc, the target value is preferably changed so as to compensate for a variation of the sensitivity of the second photodetector, thereby controlling the power of the laser beam emitted from the laser light source.

In one preferred embodiment of the present invention, the target value is preferably set to a lower value as the sensitivity of the second photodetector decreases from its initial value.

In another preferred embodiment, the optical disc drive preferably further includes: target value setting means for sequentially changing the target value in writing data on the optical disc and eventually the power of the laser beam emitted from the laser light source; means for writing information on the optical disc with the power being changed sequentially; best power searching means for determining the best target value to write the data on the optical disc by the readout signal obtained from the information that has been written on the optical disc; and means for determining a target value for reading the data from the optical disc based on the best target value to write the data on the optical disc.

In still another preferred embodiment, the target value for reading the data from the optical disc is preferably defined to be a constant number of times as large as the best target value to write the data on the optical disc.

In yet another preferred embodiment, the best power searching means preferably determines the best target value to write the data on the optical disc by the alternating current amplitude of the readout signal.

Alternatively, the best power searching means may determine the best target value to write the data on the optical disc by a duty cycle of the readout signal.

In yet another preferred embodiment, the optical disc drive preferably further includes a memory element to store a value representing a difference between a target value, which is derived from information that is pre-stored on the optical disc about the power of the laser beam in writing the data on the optical disc, and the target value determined by the best power searching means.

In this particular preferred embodiment, the value stored on the memory element is preferably recorded as management information on the optical disc.

In yet another preferred embodiment, the target value, derived from the information that is pre-stored on the optical disc, is preferably corrected with the value stored on the memory element to represent the difference, and the corrected target value is preferably used in reading the data from the optical disc.

In this particular preferred embodiment, the optical disc drive preferably further includes decision means for obtaining a timer upper limit value using the value stored on the memory element to represent the difference and a timer, which keeps counting until its count reaches the timer upper limit value. When the count of the timer reaches the timer upper limit value, the value stored on the memory element to represent the difference is preferably updated into a new value.

An optical disc drive driving method according to a preferred embodiment of the present invention is a method for driving an optical disc drive that includes a laser light source, a first photodetector, a second photodetector and a feedback control loop. The laser light source preferably emits a laser beam of which the intensity is changeable with the amount of drive current supplied thereto. The first photodetector preferably receives a portion of the laser beam that has been emitted from the laser light source and then reflected from an optical disc, thereby generating a readout signal. The second photodetector preferably receives another portion of the laser beam that has been emitted from the laser light source, generates an electric signal of which the level represents the power of the laser beam received, and outputs the electric signal as a light quantity detection signal. The feedback control loop preferably compares the level of the light quantity detection signal with a predetermined target value and preferably controls the amount of the drive current so that the level of the light quantity detection signal approaches the target value. The driving method preferably includes the steps of: sensing a decrease in the sensitivity of the second photodetector while writing data to the optical disc; decreasing the target value as the sensitivity of the second photodetector decreases; and regulating the amount of the drive current such that the level of the light quantity detection signal approaches the decreased target value while reading the data from the optical disc, thereby controlling the power of the laser beam emitted from the laser light source.

Other features, elements, processes, steps, characteristics and advantages of the present invention will become more apparent from the following detailed description of preferred embodiments of the present invention with reference to the attached drawings.

BRIEF DESCRIPTION OF DRAWINGS

Portions (a), (b) and (c) of FIG. 5 show relationships between laser powers and the outputs (light quantity detection signals PD) of the photodetector 2b.

BEST MODE FOR CARRYING OUT THE INVENTION

Embodiment 1

Hereinafter, an optical disc drive according to a first specific preferred embodiment of the present invention will be described.

Figure 1:
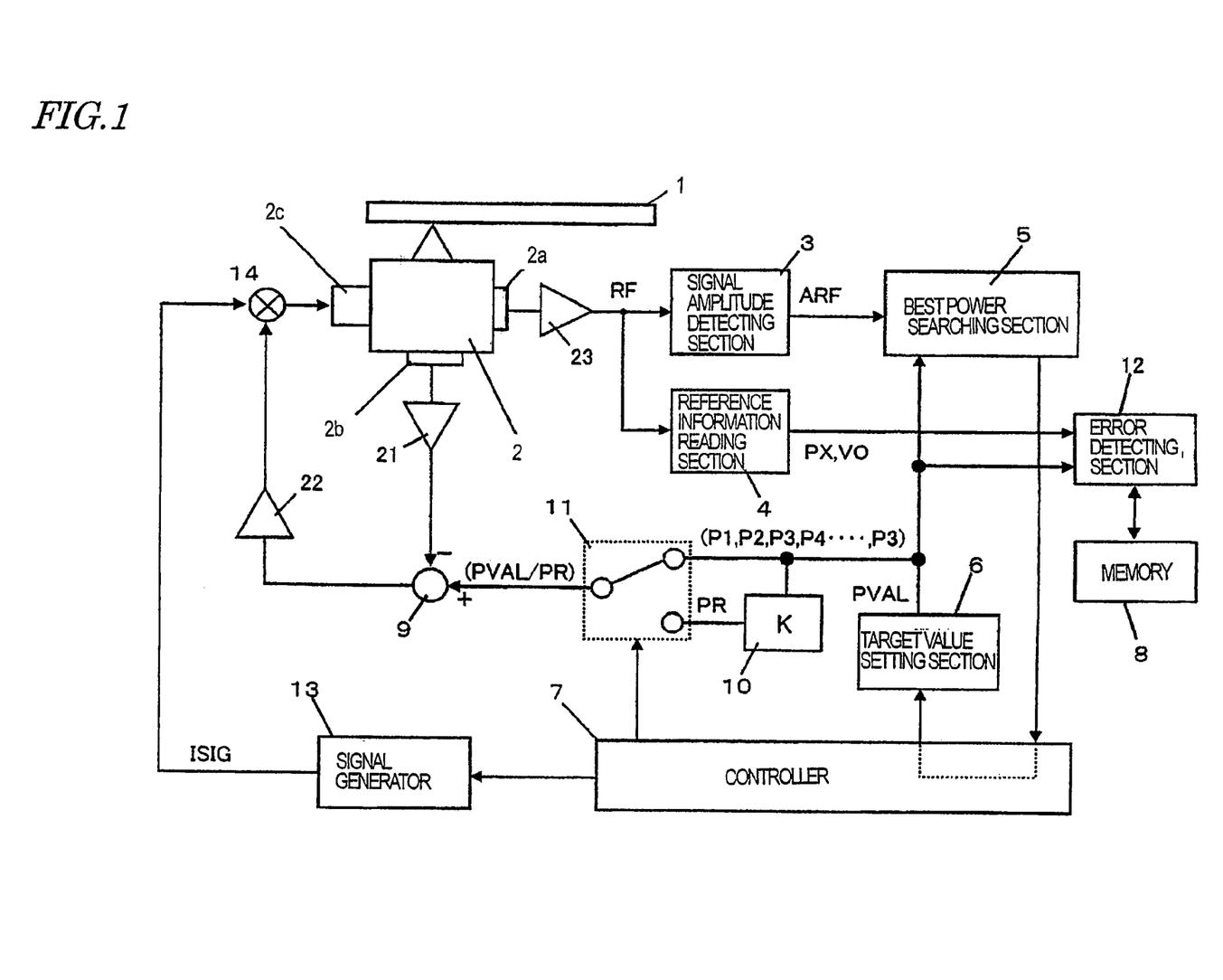
FIG. 1 is a block diagram showing a configuration for an optical disc drive according to a first specific preferred embodiment of the present invention.

First, referring to FIG. 1, shown is a block diagram of an optical disc drive according to this preferred embodiment. As shown in FIG. 1, the optical disc drive of this preferred embodiment preferably includes an optical pickup 2 for optically accessing a target track on an optical disc 1 loaded and a signal processing section for processing the output electric signal of the optical pickup 2. The optical pickup 2 is preferably fixed at the end of an arm (not shown) and preferably carries out operations of optically reading or writing data from/on a target track on the optical disc 1.

The optical disc 1 rotating is accelerated by a motor (not shown). A laser beam is emitted from the optical system of the optical pickup 2, thereby forming a laser beam spot on the data storage layer of the rotating optical disc 1.

The optical pickup 2 preferably includes a laser light source 2c that emits a laser beam with a wavelength of about 450 nm or less, a first photodetector 2a and a second photodetector 2b. The laser light source 2c emits a laser beam, the intensity of which is controlled by the amount of drive current supplied from a driver amplifier 22. The laser beam, emitted from the laser light source 2c, is focused by an objective lens (not shown) located on an actuator (not shown, either), thereby forming a beam spot on the data storage layer of the optical disc 1. The optical disc drive preferably carries out tracking control and focus control operations such that the beam spot follows predetermined tracks on the optical disc 1. These control operations may be carried out by known techniques.

The first photodetector 2a preferably receives a portion of the laser beam that has been emitted from the laser light source 2c and then reflected from the optical disc 1, thereby generating a readout signal RF by way of a buffer amplifier 23. The second photodetector 2b preferably receives another portion of the laser beam that has been emitted from the laser light source 2c, generates an electric signal of which the level represents the power of the laser beam received, and then outputs the electric signal as a light quantity detection signal PD by way of another buffer amplifier 21.

The light quantity detection signal PD is preferably supplied to a comparator 9, which compares the level of the light quantity detection signal PD with a predetermined target value PVAL. The optical disc drive of this preferred embodiment preferably further includes a feedback control loop for regulating the amount of the drive current supplied to the laser light source 2c such that the level of the light quantity detection signal PD approaches the target value PVAL. The target value PVAL to be compared with the level of the light quantity detection signal PD at the comparator 9 is preferably set by target value setting section 6. The driver amplifier 22 is preferably controlled so that the difference between the level of the light quantity detection signal PD and the target value PVAL becomes equal to a predetermined value (which is typically zero). More specifically, if the level of the light quantity detection signal PD is lower than the target value PVAL, then the amount of the drive current to be supplied from the driver amplifier 22 to the laser light source 2c increases, thereby raising the power of the laser beam being emitted from the laser light source 2c. When the laser power rises, the level of the light quantity detection signal PD will also rise. As a result, the level of the light quantity detection signal PD will approach the target value PVAL and the difference between them will become narrower. On the other hand, if the level of the light quantity detection signal PD has exceeded the target value PVAL, then the amount of the drive current supplied from the driver amplifier 22 to the laser light source 2c will decrease to narrow the difference.

In this manner, this feedback control loop controls the laser power so that the level of the light quantity detection signal PD be equal to the target value PVAL. Accordingly, if the sensitivity of the laser power detection system, including the second photodetector 2b, were unchangeable, then the power of the laser beam emitted could always be kept constant through this feedback control. Actually, however, the sensitivity of the second photodetector 2b normally decreases gradually as described above. In that case, even if a laser beam having the same power is still being emitted from the laser light source 2c, the level of the light quantity detection signal PD decreases. Then, the feedback control loop will increase the drive current to keep the level of the light quantity detection signal PD equal to the target value PVAL. As a result, the laser power will increase correspondingly.

Figure 5:
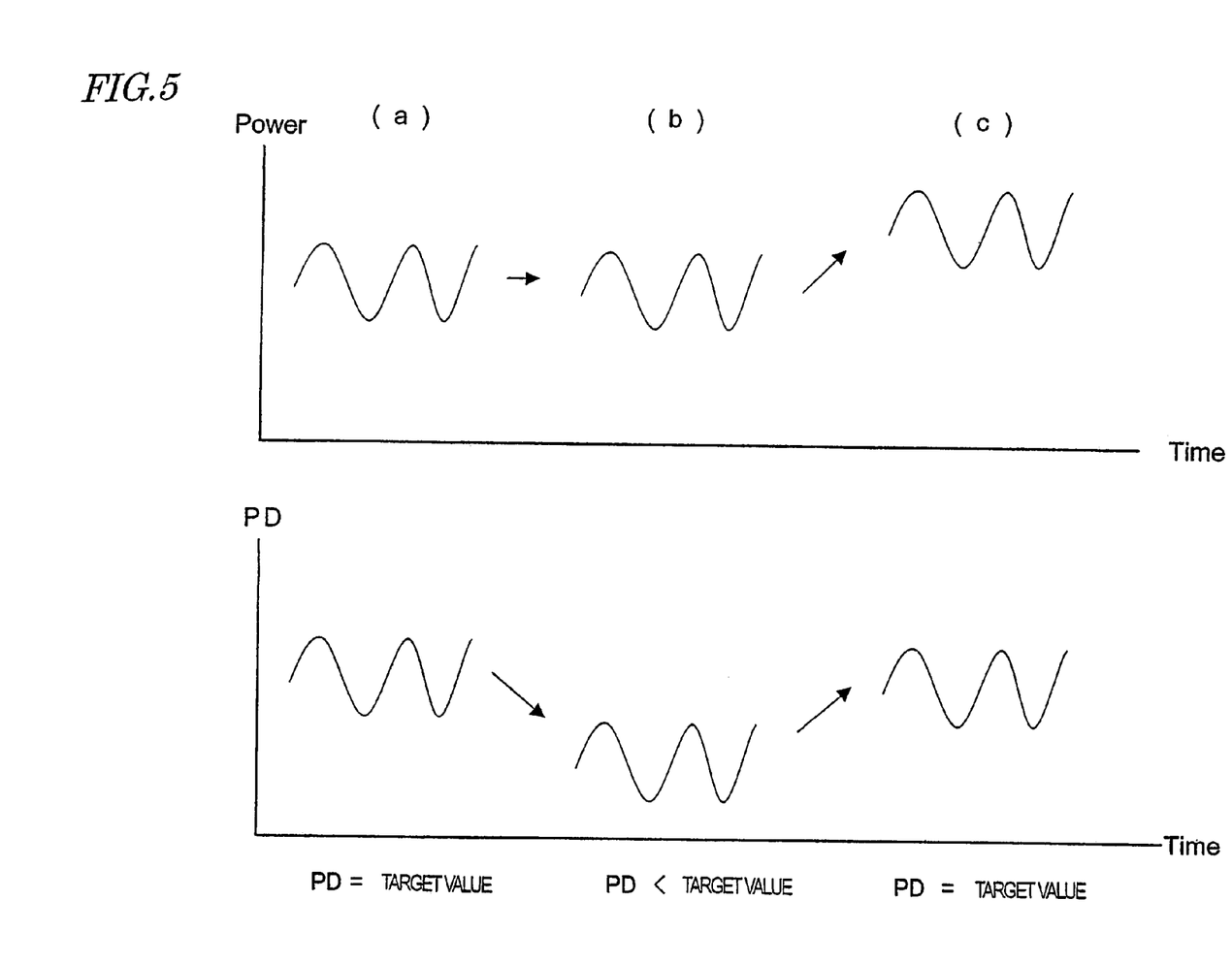

Portions (a), (b) and (c) of FIG. 5 show how the output (light quantity detection signal PD) of the second photodetector 2b changes its level as the sensitivity of the second photodetector 2*b* decreases. For example, portion (b) of FIG. 5 shows the power of the laser beam after the sensitivity has decreased and its associated level of the light quantity detection signal PD. In the state shown in portion (b) of FIG. 5, the feedback control to increase the drive current has not yet been carried out even though the level of the light quantity detection signal PD has decreased. On the other hand, portion (c) of FIG. 5 shows the power of the laser beam after the feedback control has been carried out and its associated level of the light quantity detection signal PD. As can be seen from portion (c) of FIG. 5, the laser power increases so as to recover the decreased level of the light quantity detection signal PD up to the target value.

In writing data on the optical disc 1, the best write power should be determined so as to compensate for a difference of the writing characteristic of optical discs 1. Once the best write power is determined, its associated target value PVAL is supplied to the comparator 9. In this manner, the target value PVAL can be defined according to the best write power even though the sensitivity of the second photodetector 2*b* has changed. Consequently, the write power is not affected by the sensitivity change of the second photodetector 2*b* with time.

In the conventional optical disc drive, however, the target value PVAL is fixed with respect to the read power as described above. Accordingly, as the sensitivity of the second photodetector 2*b* decreases, the read power increases.

To overcome this problem, in reading data from the optical disc 1, the optical disc drive of this preferred embodiment changes the target value PVAL so as to compensate for the variation of the sensitivity of the second photodetector 2*b*, thereby controlling the power of the laser beam being emitted from the laser light source 2*c*. More specifically, the best power to write data on the optical disc is determined first, and then best read power is determined by the best write power. This point will be described in detail.

First, the controller 7 shown in FIG. 1 sweeps the target value setting section 6 so as to sequentially change the target value PVAL of the feedback control loop within a range in which data can be written on the optical disc 1. For example, data (mark) is gradually written while the target value PVAL of the feedback control loop is sequentially increased from P1 to P2, from P2 to P3, from P3 to P4, and so on, where P1<P2<P3<P4< . . . . When PVAL=P1, the amount of the drive current supplied is controlled so as to make the output signal level of the second photodetector 2*b* equal to P1. In such a state, data is written on the optical disc 1. Specifically, the signal generator 13 shown in FIG. 1 outputs an information signal ISIG to a modulator 14, thereby modulating the drive current with the information signal ISIG. As a result, the amount of the drive current supplied increases so as to make the output level of the second photodetector 2*b* equal to P2 and the information signal ISIG is written on the optical disc 1 with the increased drive current supplied. This information signal ISIG may be written on a predetermined track 102 on the optical disc shown in FIG. 3, for example. In this case, the information signal ISIG may be a pure tone signal, a test pattern with a certain degree of regularity or even a random signal.

Next, when the target value setting section 6 switches the state PVAL=P2 into the state PVAL=P3, the amount of the drive current supplied will be controlled so as to equalize the output level of the second photodetector 2*b* with P3. Then, the data (i.e., the information signal ISIG) will be written on the optical disc in that state.

In this manner, first, the target value PVAL is changed sequentially and gradually, the write power is redefined accordingly, and then predetermined data is written on the optical disc with the redefined write power. Thereafter, the data that has been written on the optical disc will be read out from the optical disc by focusing a reading laser beam having a predetermined level thereon. The data will be read by getting the reading laser beam reflected from the optical disc and received at the first photodetector 2*a*. The output signal of the first photodetector 2*a* will be supplied as the readout signal RF by way of the buffer amplifier 23.

Figure 2:
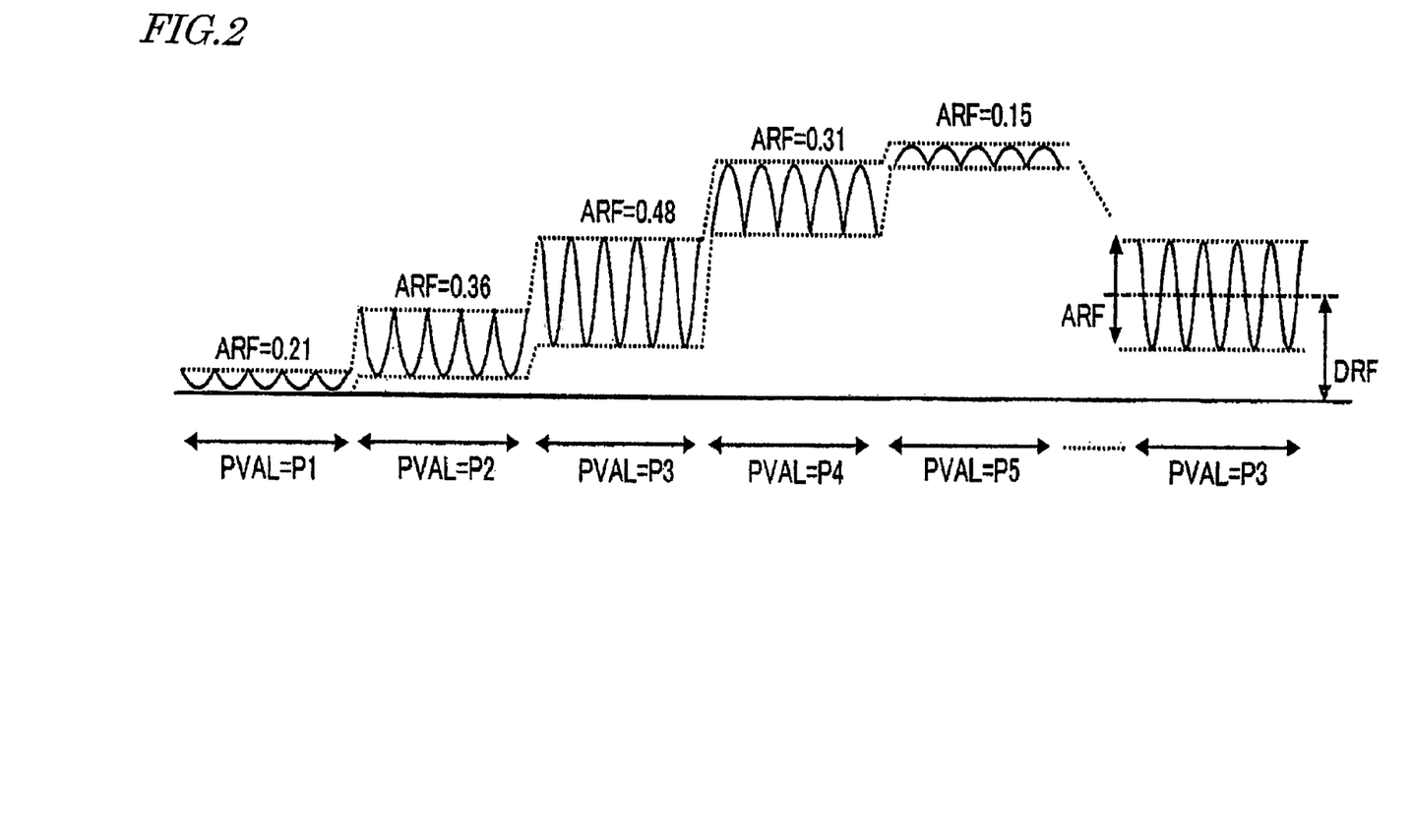
FIG. 2 shows relationships between write powers and the waveforms of readout signals in the optical disc drive shown in FIG. 1.

FIG. 2 schematically shows the waveforms of the readout signals RF obtained by reading the data (i.e., the information signal ISIG) that has been written in the sequence described above. As shown in FIG. 2, if the data is gradually written while the target value PVAL of the write power is sequentially increased from P1 to P2, from P2 to P3, from P3 to P4, and so on, then the waveform of the readout signal changes with the level of the write power.

Specifically, P1, P2, P3, and so on that are selected as the target values PVAL of the feedback control loop may be digital codes 18H, 19H, 1AH and so on that uniquely correspond to the optical outputs of about 2 mW, about 2.5 mW, about 3.0 mW and so on. It should be noted that the values of these optical outputs are defined on the supposition that the sensitivity of the second photodetector 2*b* never deteriorates. Accordingly, when the sensitivity of the second photodetector 2*b* deteriorates, the power of the laser beam being emitted from the laser light source 2*c* actually increases even if the target value P1 remains the same.

As described above, if the data that has been written with the write power changed sequentially is read, then the readout signals RF with mutually different waveforms are obtained as shown in FIG. 2. The amplitude of the readout signal RF (including the amplitude of the AC component and the amplitude of the DC component thereof) changes with the write power. Accordingly, the best write power can be found by this amplitude.

As shown in FIG. 1, the optical disc drive of this preferred embodiment preferably further includes signal amplitude detecting section 3 for detecting the amplitude of the readout signal RF and best power searching section 5 for determining the best write power in reference to the signal amplitude detected. The best power searching section 5 preferably searches for the best write power level with the amplitude of the readout signal RF (e.g., the AC amplitude, in particular). The reasons are as follows. The higher the write power, the greater the amplitude of the DC component of the readout signal RF. In contrast, if the write power increases excessively, then the amplitude ARF of the AC component will rather decrease due to the saturation of the data stroage layer on the optical disc and the signal quality will rather drop. Accordingly, the write power, at which the amplitude ARF of the AC component of the readout signal RF is maximized, is preferably found and determined as the best write power.

In the example shown in FIG. 2, when the target value PVAL (∝ the emission power) for a data write operation is set equal to P3, the amplitude ARF of the readout signal RF is 0.48, which is the maximum value. The signal amplitude detecting section 3 detects the amplitude ARF of the readout signal RF. The best power searching section 5 determines the target value PVAL for the data write operation according to the amplitude ARF. In the example shown in FIG. 2, the best power searching section 5 defines the target value PVAL for the data write operation at P3. The target value PVAL in writing data defines the best write power. Thus, P3 in the example shown in FIG. 2 will be sometimes referred to herein as "the best write power".

Figure 3:
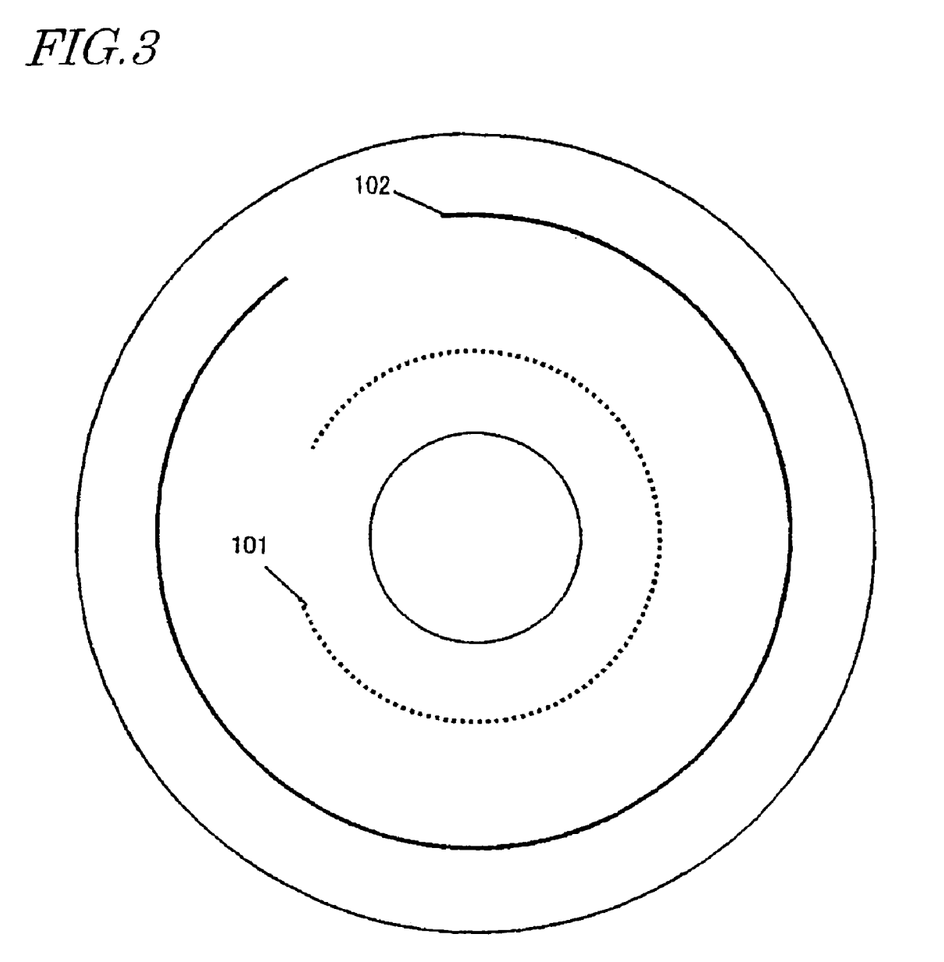
FIG. 3 is a plan view of an optical disc 1 for use in the optical disc drive shown in FIG. 1.

On the other hand, management information about the best write power on the optical disc 1 is preferably pre-stored on the optical disc 1. For example, management information having the correspondence shown in the following Table 1 may be stored on a particular track 101 on the optical disc 1 as shown in FIG. 3:

TABLE 1

| | PX | | | | |
|---|---|---|---|---|---|
| | P1 | P2 | P3 | P4 | P5 |
| VO | 0.2 | 0.3 | 0.4 | 0.5 | 0.4 |

In Table 1, PX on the $1^{st}$ row represents the write power defined at P1, P2, P3, P4 or P5, while VO on the $2^{nd}$ row represents the expected amplitude ARF of the readout signal RF to be obtained by reading the data that has been written with the write power. The contents of this Table 1 are preferably stored as digital information on the management area of the optical disc 1. In this example, when the write power PX is defined at P4, the expected value VO of the amplitude ARF of the readout signal RF is 0.5, which is the maximum value. When the optical disc on which such digital information is stored is loaded into the optical disc drive, the optical pickup will access the management area of the optical disc to read out the management information and define the laser write power at P4.

Generally speaking, the contents of the digital information stored on one optical disc are different from those of the digital information stored on another. This is because even if recording marks have been formed on these two optical discs with the same laser write power, the shapes of the recording marks may still be different from each other according to the structures of the optical discs and the characteristics of the data storage layers thereof.

To define the contents of the digital information such as that shown in Table 1 for each optical disc, the manufacturer may test the optical disc to be shipped by actually trying writing data on the track 102 of the optical disc with an accurately calibrated, standard recorder and then measuring the amplitudes ARF of the readout signals RF. Then, based on the measured amplitudes, the manufacturer may define the relationship between the write power PX defined and the expected value VO of the amplitude ARF of the readout signal RF. The digital information representing this relationship is written on each optical disc being tested and to be shipped.

It should be noted, however, that if there is only a slight variation in the property of the data storage layer among multiple optical discs, then not all of those optical discs have to be tested before shipment. In that case, the digital information with the same contents may be stored on all optical discs belonging to the same production lot. Such digital information may be recorded as either embossed pits or wobbled grooves on the optical discs being manufactured.

In the optical disc drive of this preferred embodiment, the management information written on the optical disc is extracted by reference information reading section 4 from the readout signal RF obtained by the first photodetector 2a. The reference information reading section 4 may be implemented as a digitizer, a PLL or a digital demodulator (or decoder).

In the example shown in FIG. 2, the target value PVAL of the best write power, obtained by writing data on the track 101 with the target value PVAL sequentially changed and by reading the written data, is P3. Meanwhile, according to the management information stored on the optical disc, the best write power PX is P4 as shown in Table 1.

Supposing that the sensitivity of the second photodetector 2b has not decreased, the data is preferably written with a power that is lower than the scheduled best write power P4 by "P4−P3". This means that the optical disc 1 has increased its recording sensitivity as compared with the as-manufactured one. However, that would never happen actually. Thus, the decrease in the best write power should be caused by the decrease in the sensitivity of the second photodetector 2b. That is to say, once the output of the second photodetector 2b has decreased, the photodetector 2b will keep outputting the same amount of current as that output in response to the laser beam with the write power P3 even if the laser light source 2c is actually radiating a laser beam with the best write power P4. As a result, the write power P3 is apparently regarded as the best write power as shown in FIG. 2. Accordingly, the absolute value of the difference "P4−P3" may be used as an indicator representing the degree of deterioration in the recording sensitivity of the second photodetector 2b.

In this preferred embodiment, the best write power is preferably determined by the best power searching section 5 and target value setting section 6 under the control of the controller 7, and not only the write power but also read power are controlled by reference to this best write power. As a result, the read power can be defined so as to achieve the highest SNR without causing any read light induced deterioration.

The present inventors discovered that the read power-write power ratio k of the best read power to the best write power is substantially determined by the composition (e.g., Ge—Te—Sb) of the data storage layer of an optical disc. Thus, based on this discovery, the best read power is defined proportionally to the best write power in this preferred embodiment. That is to say, the target value PR of the best read power is determined by the equation PR=K×P3. Specifically, after PVAL=P3 is determined as a result of the best write power search, the target values to be supplied to the comparator 9 are changed via a switch 11. More specifically, the state in which the best write power P3 is supplied from the target value setting section 6 to the comparator 9 is switched into a state in which a signal having a level K×P3 is supplied as the target value of the read power in the control loop to the comparator 9 by way of a K multiplier 10.

The read power determined in this manner is calculated from the recording sensitivity of the optical disc 1. Thus, no read light induced deterioration occurs because the read power has been determined in reference to the recording sensitivity of the optical disc 1.

It should be noted that the deterioration in photosensitivity may occur not only in the second photodetector 2b but also in the first photodetector 2a as well. However, the deterioration in the sensitivity of the first photodetector 2a should not affect the best write power. This is because the best write power is determined according to multiple readout signal amplitudes that are associated with multiple write powers as shown in FIG. 2.

It should be noted that the best write power does not have to be determined by the exact method adopted in the preferred embodiment described above. In the method of this preferred embodiment, the best write power is searched for by measuring the amplitudes of readout signals representing the data that was written with multi-stage powers. Alternatively, the best write power may also be determined by the duty ratios (i.e., the ratio of the L-level to the H-level) of the readout signals.

Another specific method of searching for the best write power will be described.

Suppose the duty ratio is 1 to 1 in an original write signal. For example, suppose the original write signal is represented by "1111000011110000 . . . ". In that case, if the signal is written with the best write power, then the signal will have a duty ratio of approximately 1 to 1. However, if the write power has shifted from its best level, then the duty ratio will no longer be 1 to 1 as shown in FIG. 2. Accordingly, by searching for a write power that will result in the duty ratio of about 1 to 1, the target value PVAL of the best write power can be obtained. The best read power can be obtained based on this value by the same method as that described above.

When the target value PVAL of the best write power (i.e., P3 in the preferred embodiment described above) is obtained by any of various methods, the difference between that target value PVAL and the best setting PX (i.e., P4 in the preferred embodiment described above) as defined by the management information on the track 101 of the optical disc 1 becomes clear. As described above, this difference represents how much the photodetector has deteriorated. The deterioration of the photodetector does not advance so rapidly. Accordingly, once the degree of deterioration is known by the best write power PVAL obtained, the value representing the degree of deterioration may be stored on the memory of the optical disc drive and the information on the memory may be used for a predetermined period of time.

For example, in the optical disc drive shown in FIG. 1, the difference PE (=P3−P4), representing the degree of deterioration of the photodetector, is obtained by error detecting section 12 and then stored on a memory 8. In newly determining a read power, the difference PE may be added to the best setting PX derived from the management information on the optical disc. In this manner, the best read power can be determined.

If the best setting PX derived from the management information on the optical disc is P4 as in the example shown in Table 1, the best read power is given by:

$$P4+PE=P4+(P3-P4)=P3$$

As described above, P1, P2, P3, P4 and so on are respective settings corresponding to multiple write powers. However, the setting PX as defined by the management information on the track 101 does not have to be equal to P1, P2, P3 . . . of this preferred embodiment. The management information may have any format as long as a unique relationship is satisfied between the setting to be used as the target value PVAL and the setting as defined by the management information. For example, the management information stored on the optical disc may include write power settings Q1, Q2, Q3, . . . (where P1<Q1<P2 and P2<Q2<P3), which are different from multi-stage settings expected by the optical disc drive, and their associated amplitudes V0. In that case, the amplitudes corresponding to P1, P2, P3 and so on may be calculated by subjecting the management information, read out from the optical disc, to curvilinear interpolation. Also, the number of data included in the management information on the optical disc does not have to be equal to that of data prepared by the optical disc drive.

Embodiment 2

Hereinafter, an optical disc drive according to a second specific preferred embodiment of the present invention will be described with reference to FIG. 4. The optical disc drive of this preferred embodiment includes almost all components of the optical disc drive shown in FIG. 1 except that the best power searching section 5 is replaced by best power searching section 51. Also, the optical disc drive of this preferred embodiment further includes decision section 15 and a timer 16. In the optical disc drive including these alternative or additional components, if the second photodetector 2b has been found hardly deteriorated, the best power search does not have to work to determine the read power but the laser light source 2c is driven with the initial read power PRO used as the target value.

Figure 4:
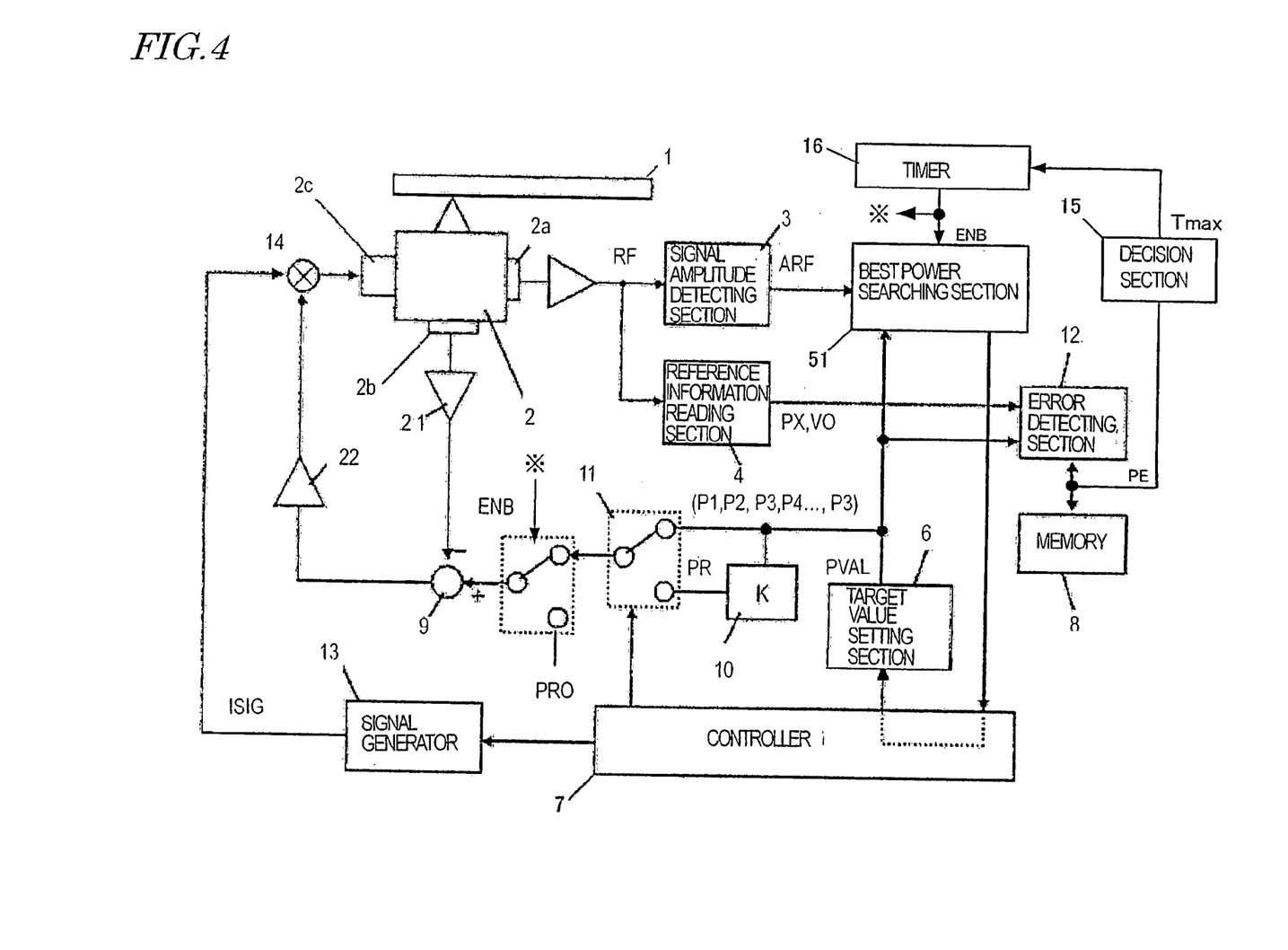
FIG. 4 is a block diagram showing a configuration for an optical disc drive according to a second specific preferred embodiment of the present invention.

In the optical disc drive shown in FIG. 4, each component, identified by the same reference numeral as the counterpart of the optical disc drive shown in FIG. 1, has the same function and configuration as the counterpart, and the description thereof will be omitted herein.

In this preferred embodiment, first, the best power searching section 51 is started to write data on the optical disc 1 with write powers P1, P2, P3, P4 and so on and search for the best write power. The best write power found in this manner is multiplied by the constant K, thereby obtaining the read power PR.

In this processing method, data can be read from the optical disc with the best read power that has been defined so as to cause no read light induced deterioration even if the second photodetector 2b has deteriorated. However, even if the optical disc 1 has been loaded into the optical disc drive just for the purpose of reading data therefrom, a series of processing, including a write operation to search for the best write power, will be carried out automatically, thus delaying the start of the data read operation after the disc has been loaded. Thus, to get the optical disc drive started in a shorter time, the optical disc drive of this preferred embodiment has the function of selectively performing the best power search only when it is needed.

In this preferred embodiment, when loaded with the optical disc, the optical disc drive reads management information from the disc. Then, the error detecting section 12 calculates the difference PE between the setting PX as defined by the management information and the best power found, and writes the difference PE on the memory 8. At this point in time, information about the difference PE is supplied to the decision section 15. Based on this difference PE, the decision section 15 calculates the timer upper limit value Tmax, i.e., the amount of time in which the best power search will be started next time. The decision section 15 may obtain the timer upper limit value Tmax in accordance with the following function:

$$T\max = C/PE(PE \geq PE0)$$
$$= C/PE0(PE < PE0)$$

where C is a constant. Specifically,
If PE<0.1 mW, then Tmax=100 hours,
If PE=0.2 mW, then Tmax=50 hours, and
If PE=1.0 mW, then Tmax=10 hours.

The timer upper limit value Tmax calculated is supplied to the timer 16. In response, the timer 16 starts counting and stops generating an enable signal ENB until the count reaches Tmax. When generated, the enable signal ENB will be supplied to the best power searching section 51 and switch 17. It is not until this enable signal ENB is asserted that the best power searching section 51 starts the series of operations described above. Also, the initial fixed value PR0 is always supplied as the target value of the read power to the best power searching section 51. For example, if the difference PE between the setting and the best power found is 0.1 mW, then the next search will not be started until 100 hours later even if the optical disc drive has just been started.

In the optical disc drive of this preferred embodiment, the smaller the degree of deterioration of the second photodetector 2b, the longer the interval at which the best power search is carried out. Thus, it is possible to avoid the unwanted situation where the period of time to start the optical disc drive extends excessively. It should be noted that the timer 16 preferably performs the counting operation only while the optical disc drive is ON and preferably holds the previous count if the optical disc drive is OFF.

The embodiments of the present invention as described above comprise the signal amplitude detecting section 3, reference information reading section 4, best power searching section 5, target value setting section 6, and error detecting section 12. These constituent elements of the signal processing section can be comprised of hardware or a combination of hardware and software.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

INDUSTRIAL APPLICABILITY

The present invention provides an optical disc drive that can control its laser light source with accurate read power even if its photodetector has deteriorated due to exposure to a short-wave laser beam for a long time.

The invention claimed is:

1. An optical disc drive comprising:
a laser light source for emitting a laser beam of which the intensity is changeable with the amount of drive current supplied thereto;
a first photodetector, which receives a portion of the laser beam that has been emitted from the laser light source and then reflected from an optical disc, thereby generating a readout signal;
a second photodetector, which receives another portion of the laser beam that has been emitted from the laser light source, generates an electric signal of which the level represents the power of the laser beam received, and outputs the electric signal as a light quantity detection signal; and
a feedback control loop, which compares the level of the light quantity detection signal with a predetermined target value and controls the amount of the drive current so that the level of the light quantity detection signal approaches the target value,
wherein in reading data from the optical disc, the target value is changed so as to compensate for a variation of the sensitivity of the second photodetector, thereby controlling the power of the laser beam emitted from the laser light source, said variation of the sensitivity of the second photodetector being detected when a write power optimization is conducted.

2. The optical disc drive of claim 1, wherein the target value is set to a lower value as the sensitivity of the second photodetector decreases from its initial value.

3. The optical disc drive of claim 1, comprising:
target value setting means for sequentially changing the target value in writing data on the optical disc and eventually the power of the laser beam emitted from the laser light source;
means for writing information on the optical disc with the power being changed sequentially;
best power searching means for determining the best target value to write the data on the optical disc by the readout signal obtained from the information that has been written on the optical disc; and
means for determining a target value for reading the data from the optical disc based on the best target value to write the data on the optical disc.

4. The optical disc drive of claim 1, wherein the target value for reading the data from the optical disc is defined to be a constant number of times as large as the best target value to write the data on the optical disc.

5. The optical disc drive of claim 3, wherein the best power searching means determines the best target value to write the data on the optical disc by the alternating current amplitude of the readout signal.

6. The optical disc drive of claim 3, wherein the best power searching means determines the best target value to write the data on the optical disc by a duty ratio of the readout signal.

7. The optical disc drive of claim 3, further comprising a memory element to store a value representing a difference between a target value, which is derived from information that is pre-stored on the optical disc about the power of the laser beam in writing the data on the optical disc, and the target value determined by the best power searching means.

8. The optical disc drive of claim 7, wherein the value stored on the memory element is recorded as management information on the optical disc.

9. The optical disc drive of claim 7, wherein the target value, derived from the information that is pre-stored on the optical disc, is corrected with the value stored on the memory element to represent the difference, and
wherein the corrected target value is used in reading the data from the optical disc.

10. The optical disc drive of claim 9, further comprising:
decision means for obtaining a timer upper limit value using the value stored on the memory element to represent the difference; and
a timer, which keeps counting until its count reaches the timer upper limit value,
wherein when the count of the timer reaches the timer upper limit value, the value stored on the memory element to represent the difference is updated into a new value.

11. A method for driving an optical disc drive that includes a laser light source, a first photodetector, a second photodetector and a feedback control loop, wherein the laser light source emits a laser beam of which the intensity is changeable with the amount of drive current supplied thereto; the first photodetector receives a portion of the laser beam that has been emitted from the laser light source and then reflected from an optical disc, thereby generating a readout signal; the second photodetector receives another portion of the laser beam that has been emitted from the laser light source, generates an electric signal of which the level represents the power of the laser beam received, and outputs the electric signal as a light quantity detection signal; and the feedback control loop compares the level of the light quantity detection signal with a predetermined target value and controls the amount of the drive current so that the level of the light quantity detection signal approaches the target value,
the method comprising the steps of:
sensing a decrease in the sensitivity of the second photodetector while writing data to the optical disc;
decreasing the target value as the sensitivity of the second photodetector decreases; and
regulating the amount of the drive current such that the level of the light quantity detection signal approaches the decreased target value while reading the data from the optical disc, thereby controlling the power of the laser beam emitted from the laser light source.

* * * * *